(12) United States Patent
Agee et al.

(10) Patent No.: US 11,921,624 B2
(45) Date of Patent: Mar. 5, 2024

(54) DYNAMIC TEMPLATED DATA TEST GENERATION AND EXECUTION

(71) Applicant: Validator, LLC, Irving, TX (US)

(72) Inventors: Jonathan Mark Agee, Carrollton, TX (US); James Michael Mihalick, Southlake, TX (US); Darrell Ray Zook, Lewisville, TX (US); Hollie Brooke Ortiz, Irving, TX (US); Eaujenae Elizabeth Francisco, Cedar Hill, TX (US); Nathan Robert Lienau, Carrollton, TX (US); Joseph Malcolm Jordan, Jr., Sarasota, FL (US); Gayle Renee Bunn, Sarasota, FL (US)

(73) Assignee: Validator, LLC, Irving, TX (US)

( * ) Notice: Subject to any disclaimer, the term of this patent is extended or adjusted under 35 U.S.C. 154(b) by 120 days.

(21) Appl. No.: 17/473,789

(22) Filed: Sep. 13, 2021

(65) Prior Publication Data
US 2022/0365873 A1 Nov. 17, 2022

Related U.S. Application Data

(60) Provisional application No. 63/189,010, filed on May 14, 2021.

(51) Int. Cl.
*G06F 11/36* (2006.01)

(52) U.S. Cl.
CPC ...... *G06F 11/3692* (2013.01); *G06F 11/3676* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 10,909,109 B1* | 2/2021 | Kambhampati | G06F 9/466 |
| 11,360,951 B1* | 6/2022 | Gilderman | G06F 16/2379 |
| 2004/0181713 A1* | 9/2004 | Lambert | G06F 11/3684 717/124 |
| 2006/0005067 A1* | 1/2006 | Llyod, Jr. | G06F 11/3414 714/E11.193 |
| 2012/0150820 A1* | 6/2012 | Sankaranarayanan | G06F 16/215 707/690 |
| 2012/0290527 A1* | 11/2012 | Yalamanchilli | G06F 16/254 707/602 |

(Continued)

*Primary Examiner* — Andrew M. Lyons
(74) *Attorney, Agent, or Firm* — Foley IP Law, LLC

(57) ABSTRACT

Dynamically generating data tests includes: receiving test templates and metadata for a plurality of data objects and, on a trigger condition: based on at least the metadata and the test templates, determining a current set of templated data tests, wherein determining the current set of templated data tests comprises: determining at least one templated data test, from a prior set of templated data tests, to cease using; determining at least one templated data test to add to the current set of templated data tests; and determining, within the current set of templated data tests, at least one templated data tests to regenerate; generating the at least one templated data test to add to the current set of templated data tests; regenerating the least one templated data test to regenerate; and executing templated data tests, within the set of current templated data tests, on the plurality of data objects.

20 Claims, 13 Drawing Sheets

(56) References Cited

U.S. PATENT DOCUMENTS

| | | | |
|---|---|---|---|
| 2014/0310231 A1* | 10/2014 | Sampathkumaran | ........................ G06F 16/254 707/602 |
| 2015/0169432 A1* | 6/2015 | Sinyagin | ............. G06F 11/3684 717/124 |
| 2015/0269062 A1* | 9/2015 | Sharda | ................ G06F 11/3688 714/38.1 |
| 2022/0253333 A1* | 8/2022 | Rizzi | ....................... G06F 9/542 |
| 2022/0342697 A1* | 10/2022 | Macfarlane | ......... G06F 11/3612 |

* cited by examiner

FIG. 5 ent application that advantageously enables dynamic templated data test generation and execution;

DYNAMIC TEMPLATED DATA TEST GENERATION AND EXECUTION

CROSS-REFERENCE TO RELATED APPLICATION

This application claims priority to U.S. Patent Provisional Application No. 63/189,010, entitled "DYNAMIC TEMPLATED DATA TEST GENERATION AND EXECUTION," filed on May 14, 2021, the disclosure of which is incorporated herein by reference in its entirety.

BACKGROUND

Data testing presents significant challenges in data-centric projects, such as building a data warehouse, transforming or merging data, or migrating data from legacy systems to cloud solutions. In a migration project, for example, that moves data from a legacy data warehouse to cloud storage, a data owner may wish to confirm that the migrated data is complete by comparing the copy in the cloud storage with the original data in the legacy data warehouse. For example, if data is migrated from a customer relations management (CRM) system to a data warehouse, the data owner may wish to confirm that all customer records are complete in the cloud storage copy.

Data sets may have large numbers of objects such as tables, each having large numbers of columns and rows, and tests are needed to ensure data completeness, integrity, and that various aspects (e.g., scale, range, type, units of measure, etc.) are correct. In some scenarios, a set of similar data tests is needed across thousands of objects that need to be run on a periodic basis, resulting in potentially thousands of data tests within a single project. Manually generating, managing, and tailoring (updating) the data tests requires significant levels of effort, which may become cost-prohibitive in some scenarios. Additionally, if multiple projects require similar sets of data tests (but tailored to the specific format and content of the projects data objects), manually recreating the set of data tests anew for each project is not only duplicative, but introduces the possibility of human error and inconsistencies.

SUMMARY

The following summary is provided to illustrate examples disclosed herein, but is not meant to limit all examples to any particular configuration or sequence of operations.

A solution for dynamically generating data tests includes: receiving metadata for a plurality of data objects; receiving a plurality of test templates; and based on at least detecting a test trigger condition: based on at least the metadata and the plurality of test templates, determining a current set of templated data tests, wherein determining the current set of templated data tests comprises: determining at least one templated data test, from a prior set of templated data tests, to cease using; determining at least one templated data test to add to the current set of templated data tests; and determining, within the current set of templated data tests, at least one templated data tests to regenerate; generating the at least one templated data test to add to the current set of templated data tests; regenerating the least one templated data test to regenerate; and executing templated data tests, within the set of current templated data tests, on the plurality of data objects.

BRIEF DESCRIPTION OF THE DRAWINGS

The disclosed examples are described below with reference to the accompanying drawing figures listed below, wherein:

FIG. 5 illustrates another screenshot of a tool that may be used with the arrangement of FIG. 1;

Figure 1:
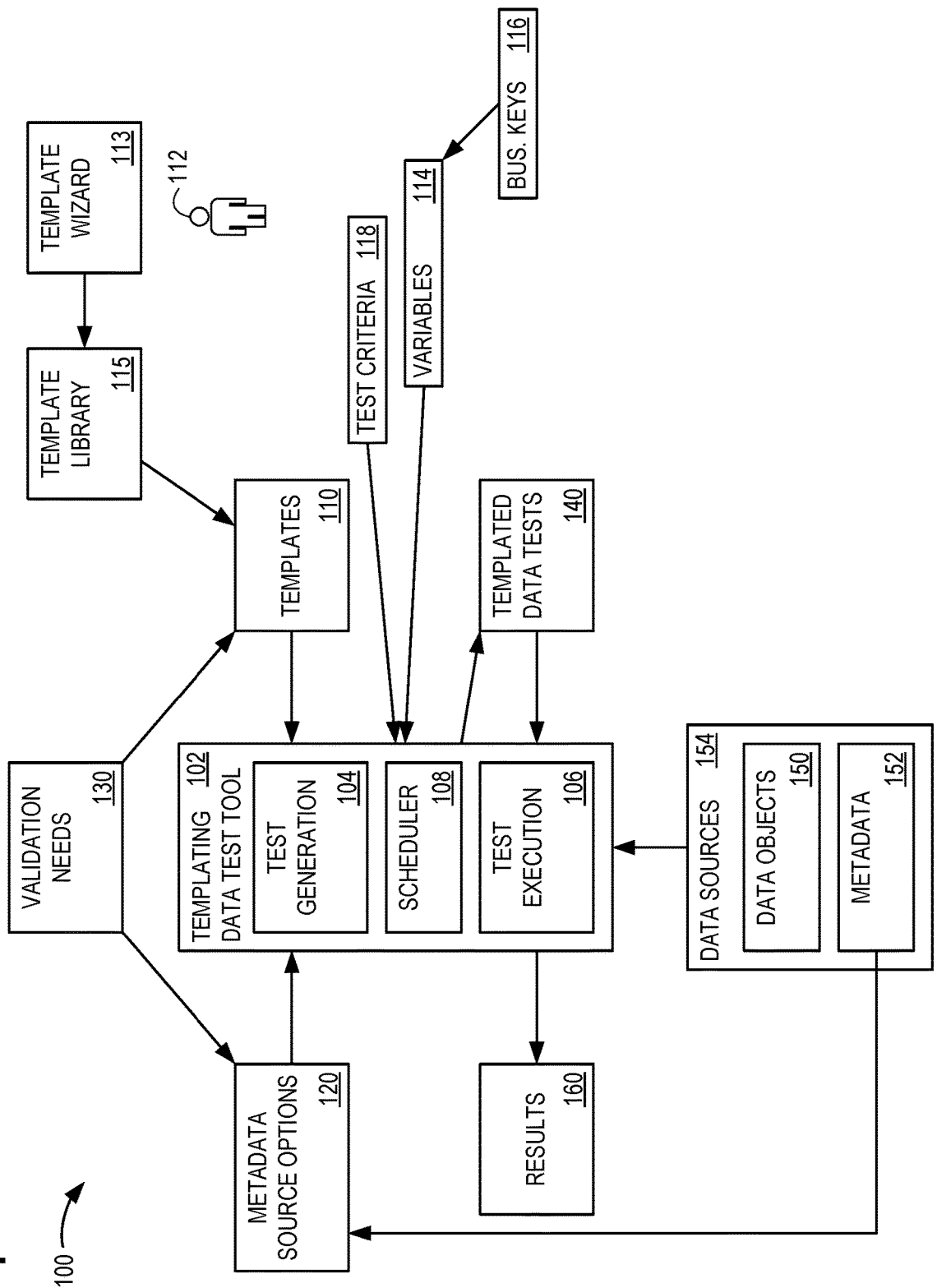
FIG. 1 illustrates an exemplary arrangement that advantageously enables dynamic templated data test generation and execution.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for enabling dynamic data test generation is disclosed. A data validation tool is used for data management tasks, such as managing data tests in a repeatable way without having to manually write the data tests anew each time. This advantageously enables scalability for large numbers of large data-centric projects. One example type of data test is comparing data in different manifestation (e.g., a legacy data warehouse and a cloud storage solution) to ensure completeness. Other example types of data test are comparing data values against range limits (e.g., is the data within a certain numeric range?) or expected statistical limits (e.g., averages), ensuring a certain number of columns and/or rows are present in a table; ensuring data fields are populated, and determining whether the data type (e.g., numeric, character, or other type) is proper.

Testing data involves the querying and/or comparison of data from one or more systems to evaluate the data against an empirical measurement or against data from another system. The base process defines pattern-based templates for data tests that allow use of metadata to generate individual tests against individual objects while customizing the test for each object. Stage 1 defines a template for data tests. Stage 2 uses metadata from either a metadata storage system, a custom query, or a file to define the set of objects for which data tests will be generated from the template. Stage 3 generates virtual or materialized child tests that are able to be executed against the data sources to be tested.

The data tests query the target manifestation of the data and perform one or more operations. For example, a data test on credit score values may determine whether all the values are between 300 and 850 and, if not, return an error alert. For another example, a data test may ensure that two tables (data objects) have the same number of rows and/or columns, or that corresponding rows or columns have the same data type (e.g., numeric or string). These types of tests may be implemented using structured query language (SQL) code in some scenarios, and various configuration-based options that do not require code in others. Programming skill is required to write SQL code correctly, and mistakes are common, providing further reasons why manual production of data tests is undesirable.

However, data objects and metadata (for those data objects) may be constantly changing. As a result, a set of templated data test (e.g., data tests based on a library of test templates and configured variables) that is set up at one time may become outdated. Some tests may no longer be applicable and so should be dropped, some new tests may be needed based on testing criteria, and some tests may require regeneration due to changes in the metadata.

Thus, an example solution for dynamically generating data tests includes: receiving metadata for a plurality of data objects; receiving a plurality of test templates; and based on at least detecting a test trigger condition: based on at least the metadata and the plurality of test templates, determining a current set of templated data tests, wherein determining the current set of templated data tests comprises: determining at least one templated data test, from a prior set of templated data tests, to cease using; determining at least one templated data test to add to the current set of templated data tests; and determining, within the current set of templated data tests, at least one templated data tests to regenerate; generating the at least one templated data test to add to the current set of templated data tests; regenerating the least one templated data test to regenerate; and executing templated data tests, within the set of current templated data tests, on the plurality of data objects.

FIG. 1 illustrates an exemplary arrangement 100 that advantageously enables dynamic templated data test generation and execution. A templated data test is the intersection of how a user (a tester) wishes to test data with a selection of metadata 152 (e.g., metadata set 202 of FIG. 2) to be used for the testing. A templating data test tool 102 intakes one or more test templates 110 and metadata 152 from a selected metadata source (e.g., one of data sources 154) and generates templated data tests 140 with a data test generation component 104. For example, a template may include variables 114, which are customized for various data tests (e.g., identifying a list of columns to be combined or concatenated for proper query). Various objects (e.g., tables) may invoke different business keys 116.

Business keys 116 customize variables 114 for a template, so that when a data test is generated for a particular data object 150, that object's business keys are included in the data test. In this way, the data test is customized for each data object (e.g., with a table name and an identified set of rows and/or columns) using a common template. The combination of a template with one or more variables and a business key, for each variable, provides a templated data test (a child test). In some examples, templated data tests 140 are not materialized as a set, but instead are executed as metadata is dynamically refreshed during testing. The use of business keys 116 represents an example of one option of how a template data test (e.g., one of templated data tests 140) may be customized by the use of metadata 152 to each object's (e.g., one of data objects 150) unique requirements. Other examples may include security policies, business rules, data types, metadata relationships, and others. The implementation of a templated data test will allow a user 112 to choose which of variables 114 may be important for their particular application and use customizable metadata to dynamically generate virtual or materialized child tests.

A data owner's data validation needs 130 determine the selected metadata source option 120 and a set of test templates 110 to be used. In some examples, the metadata indicates a set of data objects to be tested. Templated data tests 140 (e.g., child tests) are dynamically generated (materialized) and executed by a test execution component 106, querying a selected data source or data sources 154, and producing test results 160, as shown. The specific data tests used may be selected according to test criteria 118 specified by user 112. This permits a common template to serve for various similar data tests on data objects 150 with variations as needed, based on the unique characteristics for each data object. This provides computational efficiency, reliability (e.g., by reducing human errors associated with manually recreating the data tests), speed of development, and increased flexibility for testing scenarios.

In some examples, test templates 110 may require manual generation or tailoring. In some examples, a template wizard 113 facilitates template generation or tailoring, such as with a graphical interface that guides user 112 to create a template based on a desired test scenario. In some examples, templates are packaged into functional sets, stored within a template library 115, so that users with different classes of data projects may select a relevant set of test templates, based on the characteristics of their specific projects (e.g., data auditing, ongoing monitoring, or migration). In some examples, testing may be accomplished on a schedule, according to scheduler 108.

Figure 2:
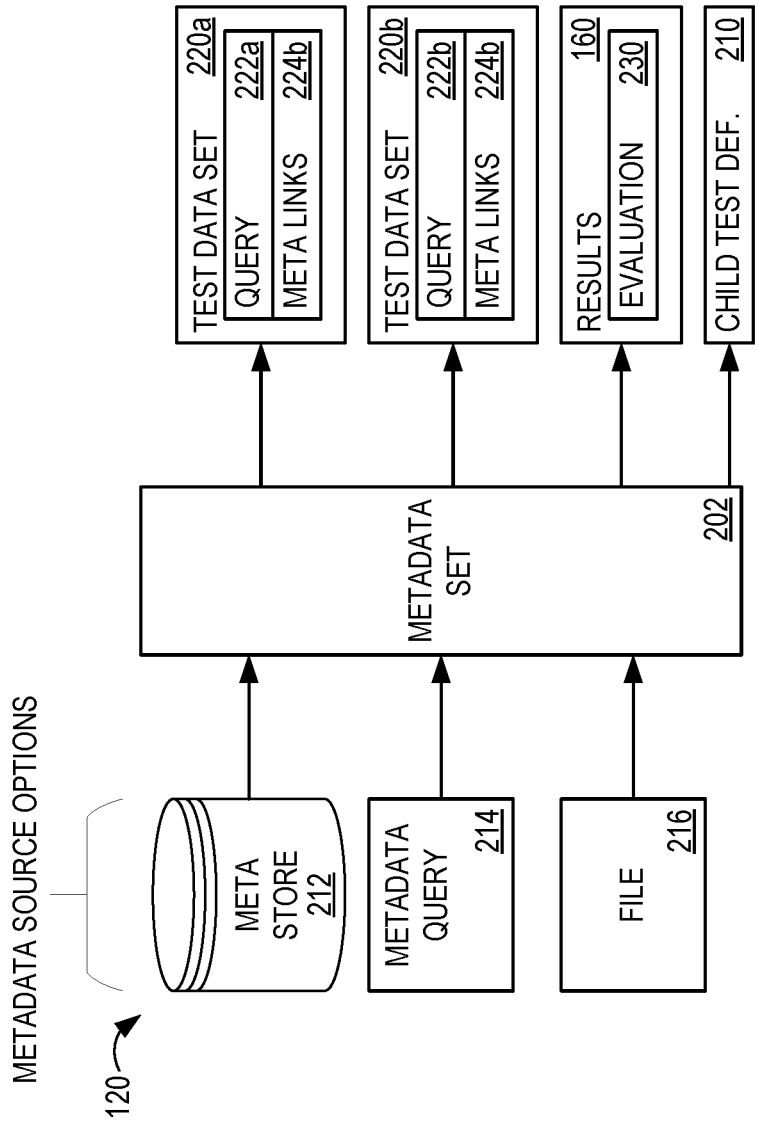
FIG. 2 illustrates exemplary options for employing the arrangement of FIG. 1.

FIG. 2 illustrates exemplary options for employing arrangement 100. Multiple metadata source options 120 may be used for the templated tests. These include a meta store 212, a metadata query 214, and a file 216, such as a flat file. A flat file may be a database that stores data in a plain text file with fields separated by delimiters, or a spreadsheet. A flat file may be used to define mappings of source data to target data, for example in a data migration project. The use of meta store 212 is illustrated in further detail in relation to FIG. 6. The use of metadata query 214 is illustrated in further detail in relation to FIG. 7. The use of file 216 is illustrated in further detail in relation to FIG. 8. The selected metadata source is fed into metadata set 202 (which is a selection or subset of metadata 152) to produce a test data set 220a that includes one or more queries 222a (e.g., SQL queries) and meta links 224a, and a test data set 220b that also includes one or more queries 222b and meta links 224b (metadata links) that link back to data sources 154 (e.g., data objects 150).

Test data set 202a and test data set 202b may each be a query, a profile value, or another test data set. Test data set 202a and test data set 202b each use a metadata tag to generate templated data tests 140 (child tests). In some examples, there is an iteration for each row in the metadata set to generate an instance of a data test by substituting the metadata elements of the metadata set into the appropriate places in the query of test data set 202a and test data set 202b, and other places as needed.

Figure 5:
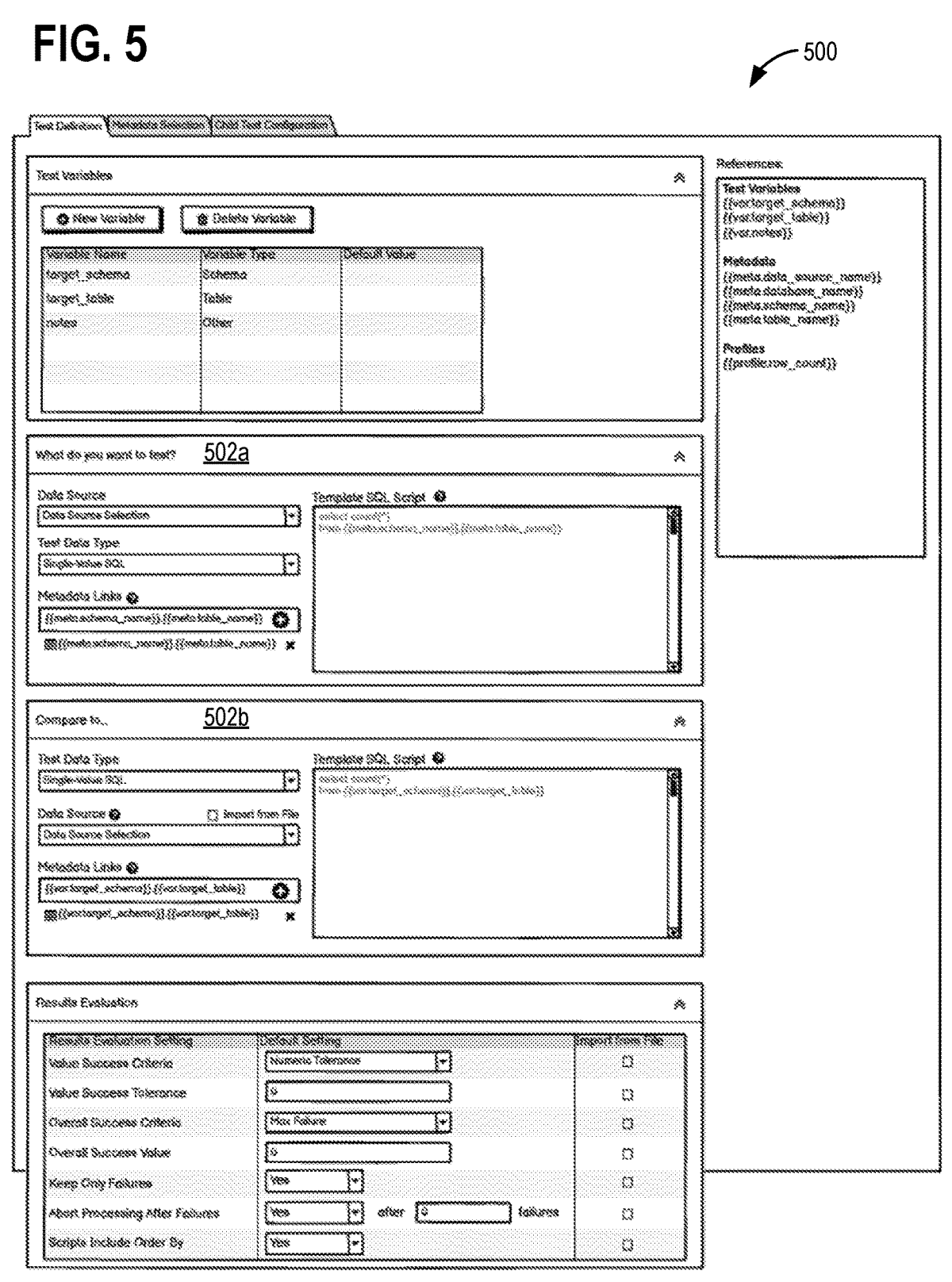

Test results 160 are passed to an evaluation component 230 (see FIG. 5). In some examples, a child test definition 210 is saved for use later in dynamic execution as data objects 150 and/or metadata 152 are updated. Metadata set 202 informs this process, so that each child test that is generated is unique and fully configured.

Figure 6:
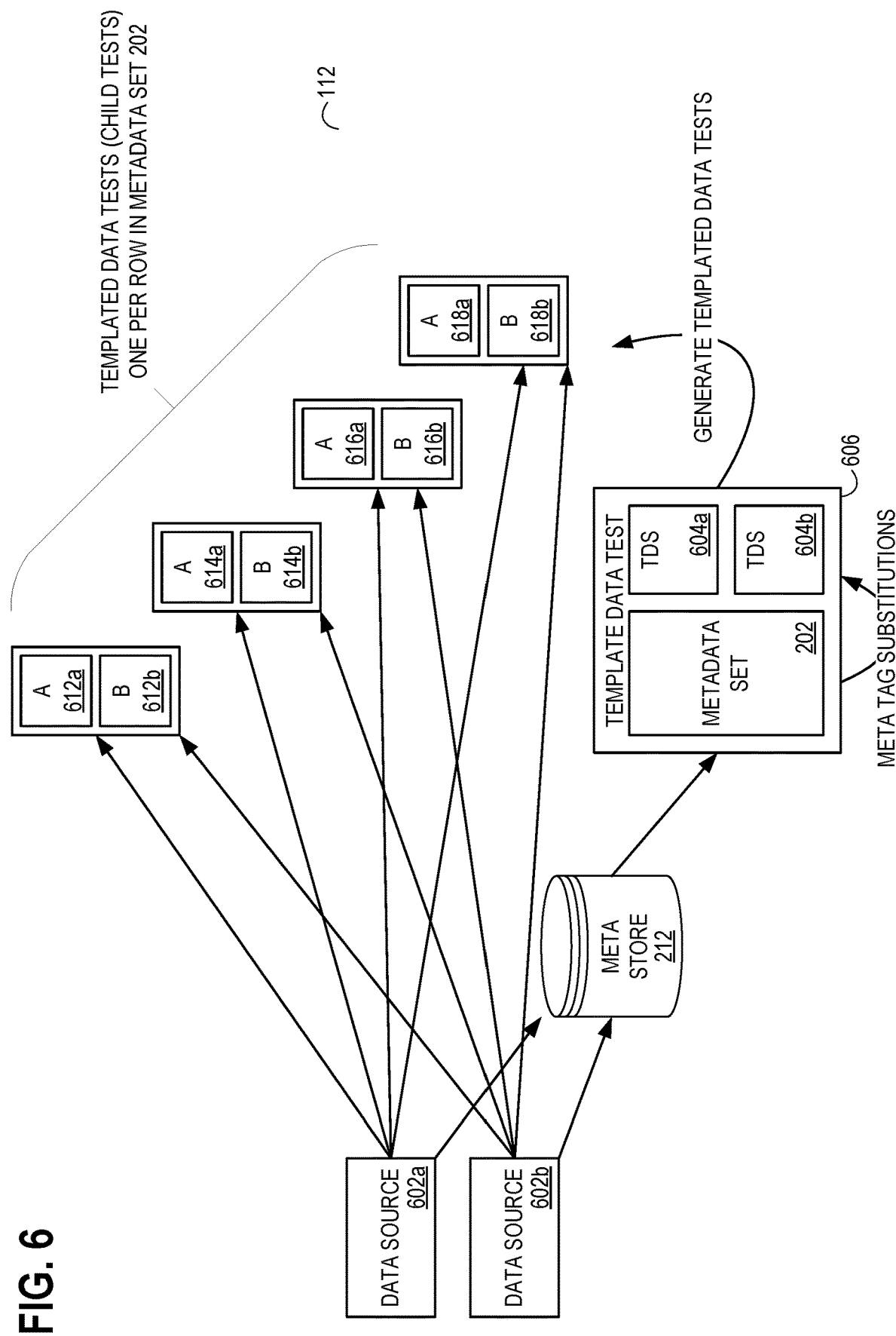
FIG. 6 illustrates materialization of child tests as may occur with the arrangement of FIG. 1, for example when the tool of FIG. 4 is set to a first option.
Figure 8:
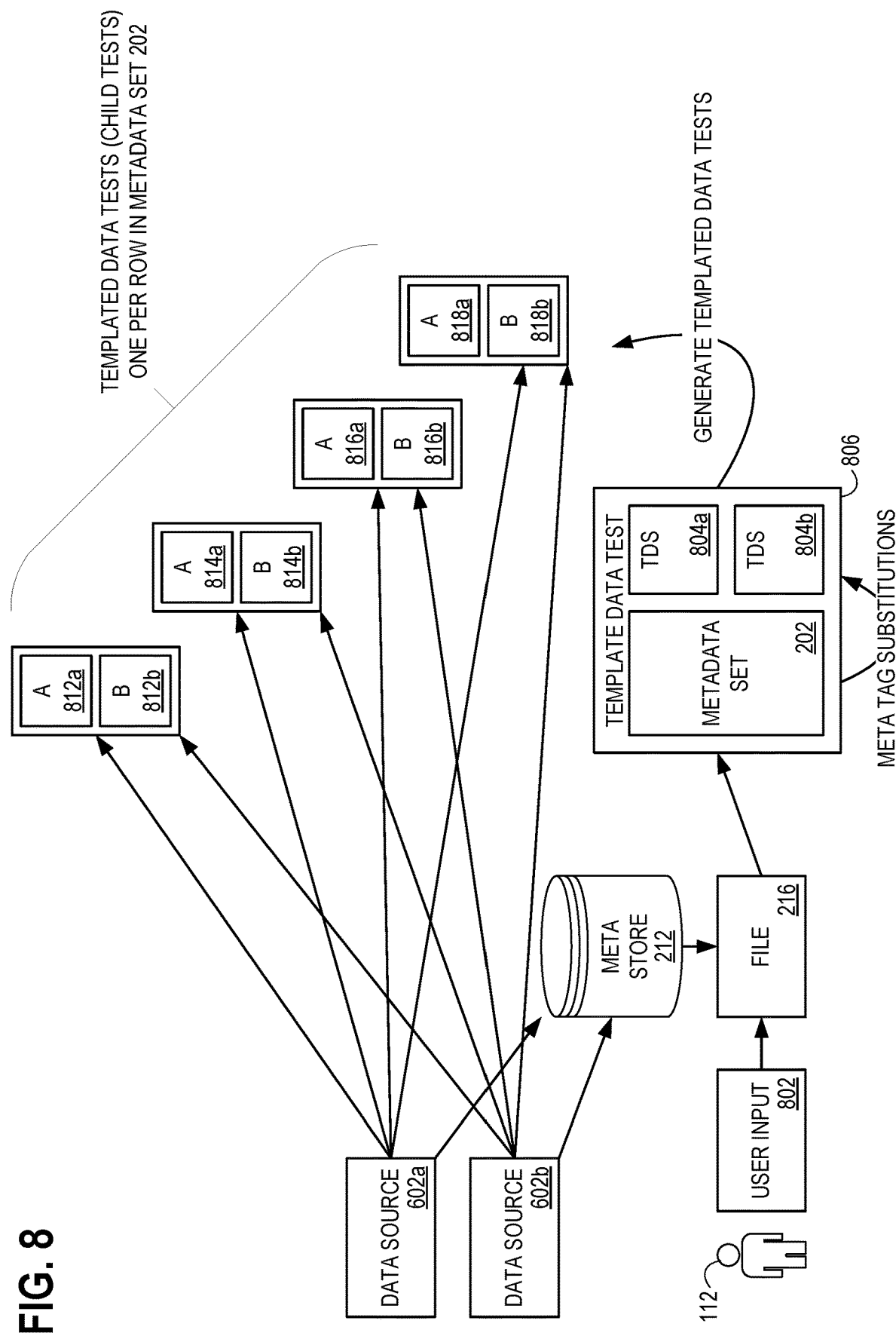
FIG. 8 illustrates materialization of child tests as may occur with the arrangement of FIG. 1, for example when the tool of FIG. 4 is set to a third option.

For example, templating data test tool 102 (of FIG. 1) may not have knowledge of data lineage, so metadata 152 is used to provide context. For example, labels may be indicated so that rows of a data column labeled "customer" in one data object (e.g., from one data source) are compared with rows of a data column labeled "customer company" in another data object (e.g., from another data source). This business metadata 354 may be configured by user 112 and placed in file 216 (as shown in FIGS. 3 and 8) or pulled from meta store 212 (as shown in FIG. 6) if the test scenario had been programmed previously.

Figure 3:
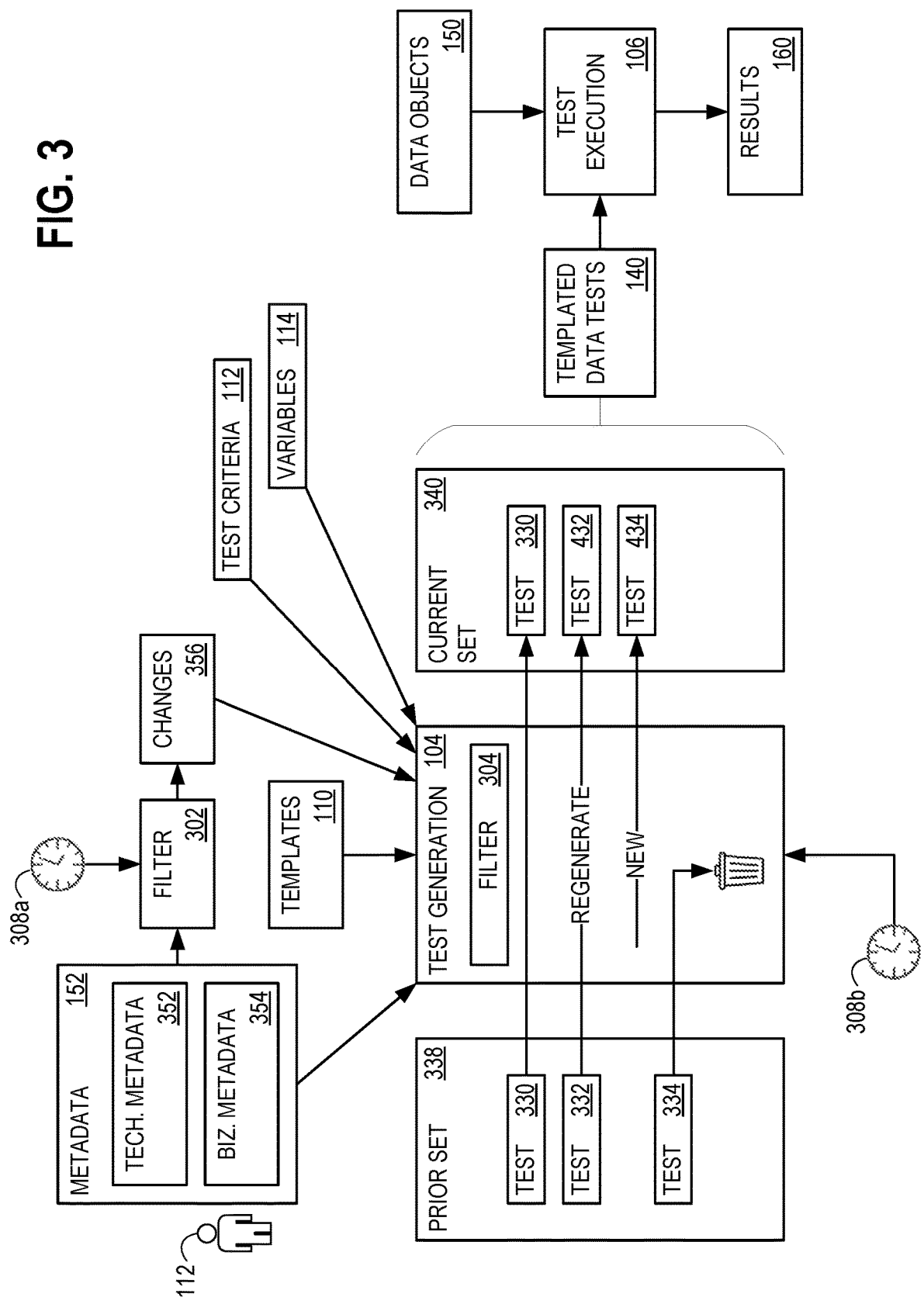
FIG. 3 illustrates generating a current set of templated data tests to run from a prior set of templated data tests, as may occur in the arrangement of FIG. 1.

FIG. 3 illustrates generating a current set of templated data tests 340 to run from a prior set of templated data tests 338, as may occur in arrangement 100. In some examples, metadata 152 includes both technical metadata 352 (e.g., metadata that may be automatically determinable, such as row and column counts), and business metadata 354, such as data labels and other flags provided by user 112. A metadata filter 302 refreshes metadata 152 on a schedule 308a, which may be set by scheduler 108 (e.g., with input from user 112) and determines changes 356 in metadata 152. Data test generation component 104 has a test filter 304 that determines which tests in prior set of templated data tests 338 are to be retained, regenerated, or dropped (e.g., cease using), as well as which new tests are needed for producing current set of templated data tests 340—which is the set of templated data tests that will be run next.

FIG. 3 reflects an instant in time, after an initial set of templated data tests has been executed, and may be several generations removed from the initial set of templated data tests. Prior set of templated data tests 338 is a prior version set of templated data tests 140, for example the set that had most recently completed execution. However, since data objects 150 and/or metadata 152 may both change over time, some templated data tests may no longer be applicable, some may be applicable but require updating (e.g., regeneration), and some new tests may be needed based on test criteria 118.

On a schedule 308b for test triggers, which may be set by scheduler 108 (e.g., with input from user 112), test filter 304 uses test criteria 118 along with changes 356 in metadata 152 to determine that templated data test 330 is to be retained as-is, templated data test 332 is to be regenerated as templated data test 432, a new templated data test 434 is to be generated, and test execution component 106 is to cease using templated data test 334. Data test generation component 104 then regenerates templated data test 432 and generates templated data test 434 using test templates 110, metadata 152, and variables 114 (and retains templated data test 330) to produce current set of templated data tests 340. Current set of templated data tests 340 is now templated data tests 140, which is executed by test execution component 106 on data objects 150 to produce test results 160. It should be noted that schedule 308a and schedule 308b may be independent or linked. For example, the metadata refresh may occur more often than test execution, the metadata may be refreshed at least whenever test execution is scheduled (so that the test execution uses a newly-refreshed version of the metadata), or metadata refresh may occur less often than test execution (so that test execution occurs multiple times between metadata refreshes).

Figure 4:
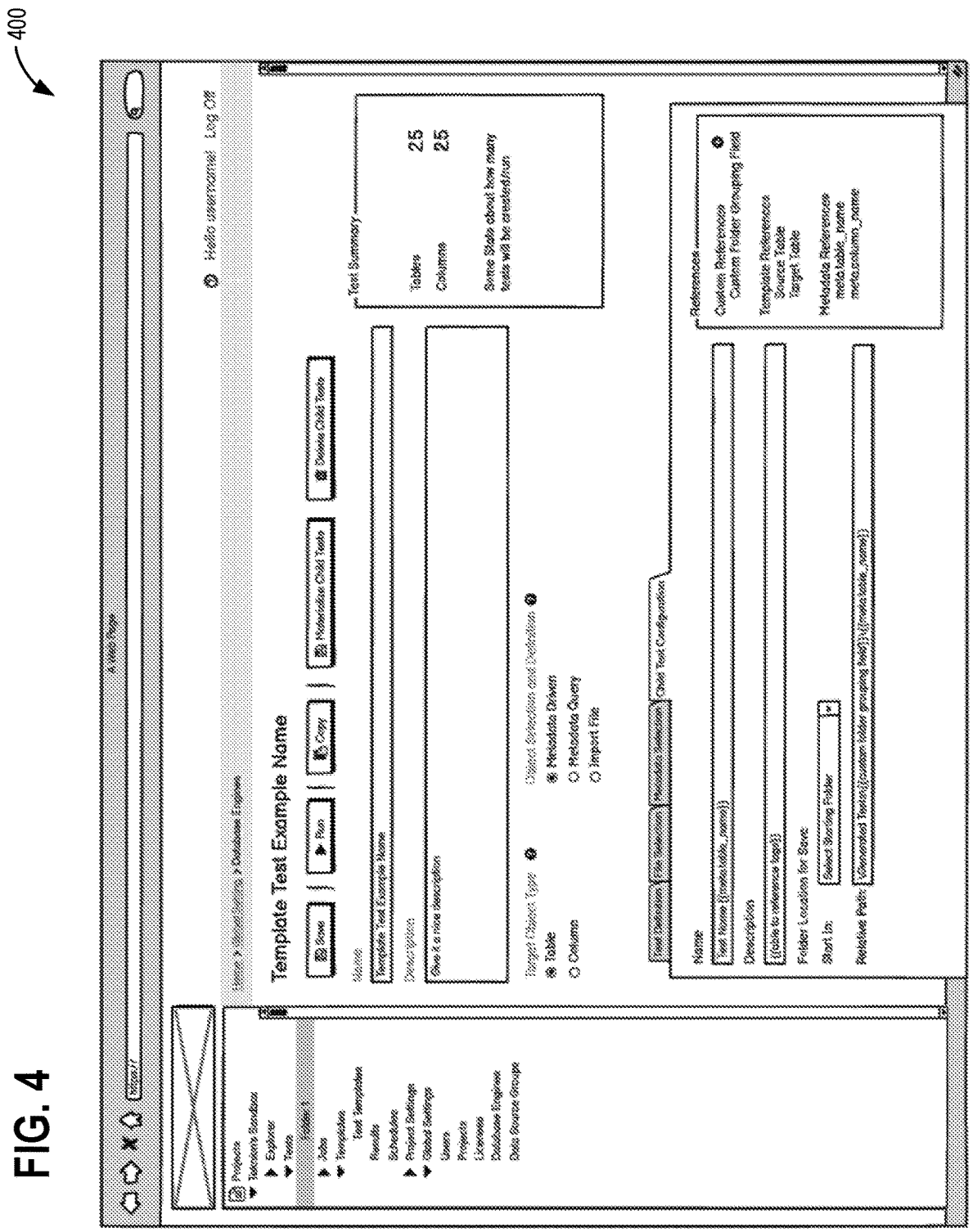
FIG. 4 illustrates a screenshot of a tool that may be used with the arrangement of FIG. 1.
Figure 7:
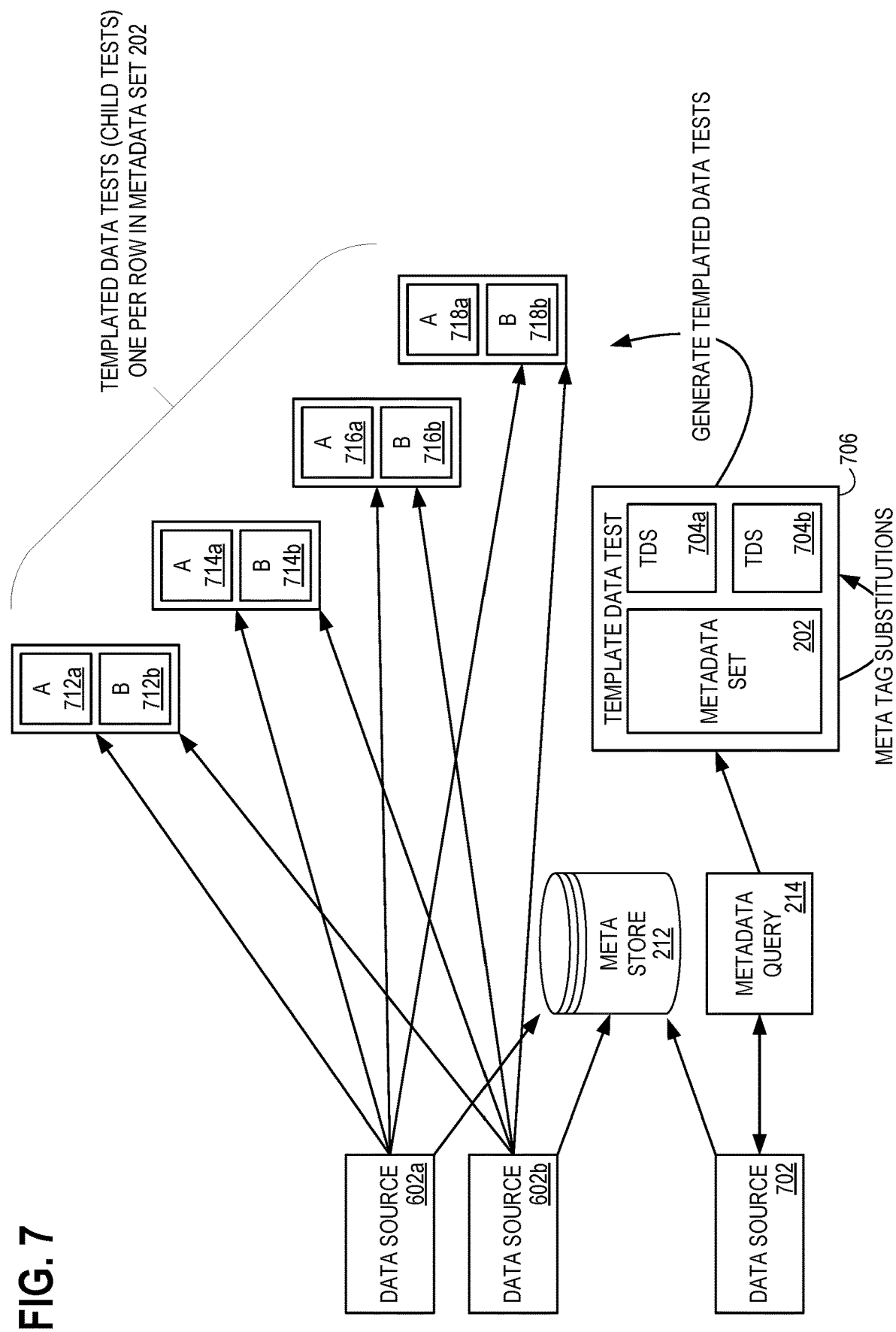
FIG. 7 illustrates materialization of child tests as may occur with the arrangement of FIG. 1, for example when the tool of FIG. 4 is set to a second option.

FIG. 4 illustrates a screenshot 400 of an example templating data test tool 102. The screenshot indicates a user selection for any of a metadata driven test generation option, which is illustrated in FIG. 6; a metadata query test generation option, which is illustrated in FIG. 7; and imported file test generation option, which is illustrated in FIG. 8. The tool has the options to save, run (execute) and copy child test definitions, as well as materialize (generate) child tests. A test job may be named and described, as illustrated. Screenshot 400 provides a view on various factors which may be selected by a user for generating child tests (templated tests). The user may also select an object type, such as a table or a column to appropriately link the child tests back to metadata for the purposes of establishing a complete understanding of the status and quality of data represented by said metadata. As illustrated by the screenshot, there are configuration options which allow for the dynamic organization and documentation of both the template data test and child data tests to give testing users the most flexibility for their testing scenario needs.

FIG. 5 illustrates an exemplary screenshot 500 of an example templating data test tool 102. Screenshot 500 illustrates how template variables are configurable, and how data sources are selected. In some scenarios, only a single data source is used, such as when data within only a single data object are to be tested (e.g., for falling within a data range). In such scenarios, the second data source selection is disabled. In some scenarios, data from two data sources are to be compared (e.g., for the same number of rows or columns or data types), and so the second data source selection is enabled. Also illustrated in FIG. 5 is that metadata links may be identified, and SQL script (code) is shown to the user.

Note two sections of screenshot 500, labeled as "What do you want to test?" 502a and "Compare to" 502b. Sections 502a and 502b correspond to test data set 202a and test data set 202b, respectively, as shown in FIGS. 2, and also correspond to test data sets (TDSs) 604a, 704a, or 804a and TDS 604b, 704b, or 804b, respectively, as shown in FIGS. 6-8. These sections 502a and 502b may also be referred to as Query A and Query B. Metadata links may be defined using the references column on the right-hand side of the screenshot. Each child test is linked to the proper metadata elements through the metadata links. String substitution may be used at the time of materializing a child test to supply the specific value to the child test, based on the metadata used. Thus, the references are placeholders until the tests are materialized with the specific schema (e.g., table, column, row).

This permits for example, a set of thousands of tests to be changed with a few selections of metadata values or sources in screenshot 500 of templating data test tool 102. This requires mere seconds, rather than hours or days for a tester (e.g., user 112) to test voluminous data sets. Further, once a set of tests are shown to work reliably for one project, that set of tests may be rapidly leveraged for other projects, merely by supplying the proper metadata. Additionally, the results evaluation is illustrated in FIG. 5 (generated by an example of evaluation component 230 of FIG. 2), showing various success or failure criteria enabling rapid feedback for the user/tester. Throughout the template test definition, each setting may be configured to leverage metadata references either from meta store 212, metadata query 214, or file 216. Individual values may also be configured to be the same for all child tests thereby making the test author's job simpler by requiring only supplying metadata values for the elements that will dynamically change from object to object.

FIG. 6 illustrates sourcing metadata from meta store 212 of FIG. 2, for example when templating data test tool 102 is set to the metadata driven source option shown in FIG. 4. Meta store 212 may grow with use of templating data test tool 102, enabling meta store 212 to be used in more scenarios over time. In FIG. 6, meta store 212 may glean relevant information from data source 602a and data source 602b (from data sources 154) and be used as the metadata source option of FIGS. 1 and 2 for a template data test 606. With metadata set 202, metadata tag substitutions are performed for TDS 604a and TDS 604b, and the child tests are materialized and executed for data source 602a and data source 602b. Any metadata available in meta store 212 and linked to the objects which the test author has selected for testing may be referenced in and participate in metadata set 202. Examples of types of metadata that meta store 212 may contain and use in metadata set 202 include but are not limited to: technical metadata about data storage structure, relationship metadata, lineage metadata, business metadata, security and privacy policy metadata, data classifications, etc. Template test and reference tags may be used to reference any or all of these types of metadata.

Templated data tests 612a-618b are generated (e.g., child tests are materialized) so that templated data tests 612a, templated data tests 614a, templated data tests 616a, and templated data tests 618a are generated for data source 602a, and templated data tests 612b, templated data tests 614b, templated data tests 616b, and templated data tests 618b are generated for data source 602b. In some examples, one row in a table of metadata set 202 is used for a templated data test.

FIG. 7 illustrates sourcing metadata from another metadata query (e.g., from another system that has information about the data source and data destination), for example when templating data test tool 102 is set to the metadata query option shown in FIG. 4. FIG. 7 is similar to FIG. 6, although metadata query 214 queries data source 702 in order to provide metadata set 202 for a template data test 706. This example allows a templated data test to not be limited to only metadata that has already been curated and structured in a related format in meta store 212 and gives the test author the ability to dynamically define and use any available data assets to accelerate their testing projects. Metadata tag substitutions are performed for TDS 704a and TDS 704b, and the child tests are materialized and executed for data source 602a and data source 602b.

Templated data tests 712a-718b are generated (e.g., child tests are materialized) so that templated data tests 712a, templated data tests 714a, templated data tests 716a, and templated data tests 718a are generated for data source 602a, and templated data tests 712b, templated data tests 714b, templated data tests 716b, and templated data tests 718b are generated for data source 601b. In some examples, one row in a table of metadata set 202 is used for a templated data test.

FIG. 8 illustrates sourcing metadata from an imported file, for example when templating data test tool 102 is set to the import file option shown in FIG. 4. FIG. 8 is also similar to FIG. 6, although a user creates file 216 (via user input 802 from user 112) and may use metadata from meta store 212. File 216 is imported for use as the metadata for the template test. Metadata tag substitutions are performed for TDS 804a and TDS 804b for a template data test 806, and the child tests are materialized and executed for data source 602a and data source 602b.

Templated data tests 812a-818b are generated (e.g., child tests are materialized) so that templated data tests 812a, templated data tests 814a, templated data tests 816a, and templated data tests 818a are generated for data source 602a, and templated data tests 812b, templated data tests 814b, templated data tests 816b, and templated data tests 818b are generated for data source 602b. In some examples, one row in a table of metadata set 202 is used for a templated data test.

Figure 9:
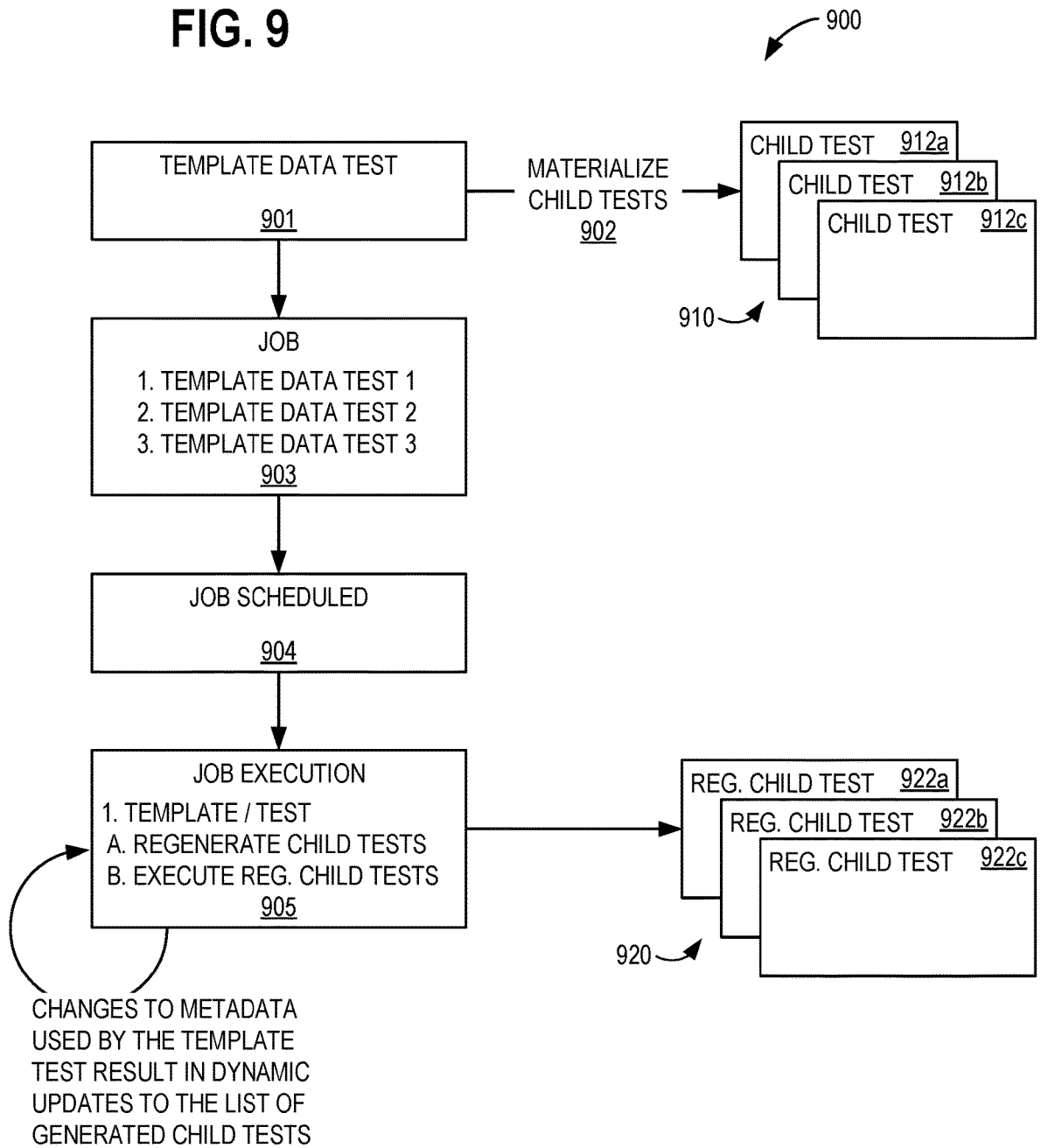
FIG. 9 illustrates a process flow that may be used with the arrangement of FIG. 1.

FIG. 9 illustrates a templated data testing process flow that may be used with the arrangement of FIG. 1. Process flow 900 illustrates a further advance: dynamic templated data test execution that dynamically regenerates child tests at the time of execution of the template data test. This means that a testing user can define a template test once and the criteria which it will use to determine what child tests to generate and from then forward, the user does not have to interact with the template even while new child tests may be generated and executed as new objects are created in the system to be tested.

A template data test is created in box 901. Child data tests 910 are generated in a process 902. Three templated data tests are illustrated as child test 912a, child test 912b, and child test 912c. In box 903, the template data test is added to a job and is configured to dynamically regenerate the child data tests and execute them. The job is scheduled in box 904. In box 905, when the job runs, the template data test dynamically refreshes its metadata set from either a metadata store, a custom query (e.g., metadata query), or an imported file. The template data test regenerates the child data tests either virtually or materialized at 905A and executes regenerated child data tests 920 at 905B. Three regenerated templated data tests are illustrated as regenerated child test 922a, regenerated child test 922b, and regenerated child test 922c. In some examples, the metadata is dynamically refreshed during the execution of the child tests, for example during monitoring scenarios. Template tests may be pointed at a production environment, and regardless of what metadata changes are made in production, the same test continues to test, but picks up new elements. This precludes the need to deploy changes to testing for some scenarios.

Figure 10A:
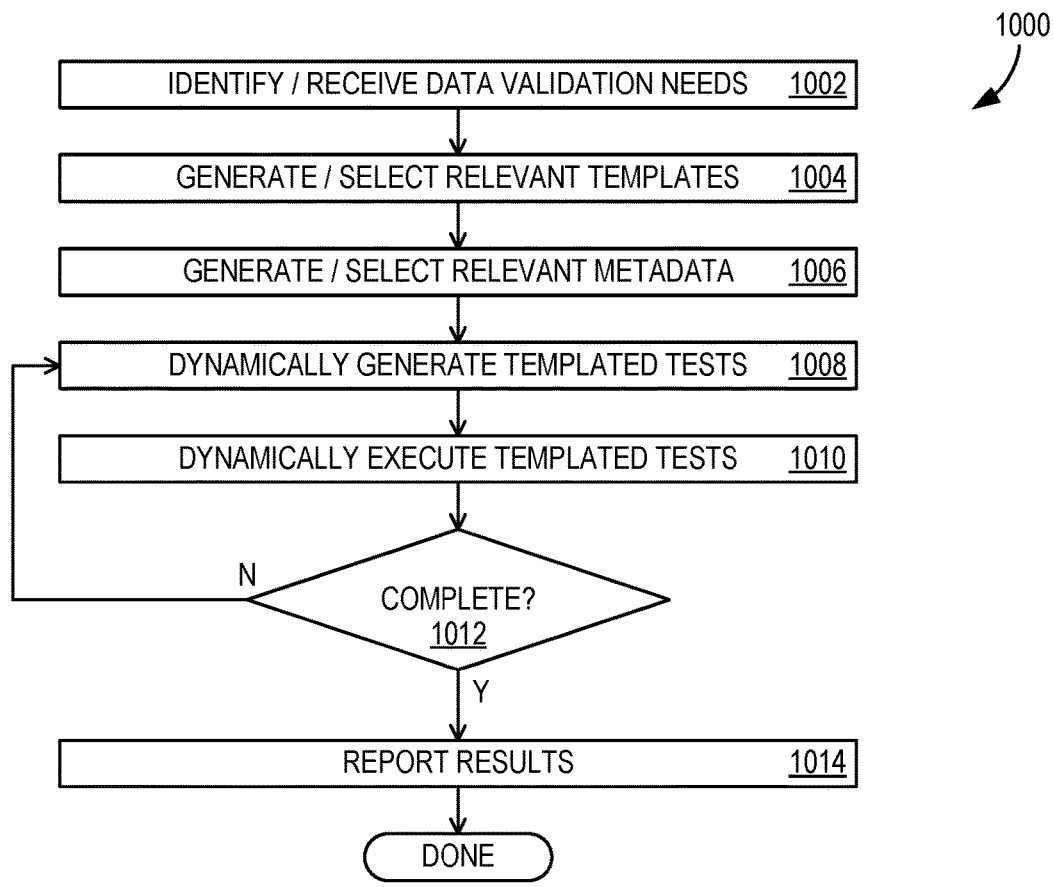
FIGS. 10A and 10B illustrate flowcharts of exemplary operations associated with FIG. 1.

FIG. 10A illustrates a flowchart 1000 of exemplary operations associated with arrangement 100. In some examples, at least a portion of flowchart 1000 may be performed using one or more computing devices 1300 of FIG. 13. Validation needs are identified or received in operation 1002. A set of relevant test templates are received in operation 1004, which may include selecting a set of pre-existing templates (e.g. from a template library) or generating a new template. Metadata is received in operation 1006, which may include selecting metadata from a meta store, receiving metadata from a metadata query, or generating, editing or receiving a file such as a flat file.

Templated tests are generated in operation 1008, based on at least the metadata. This includes configuring variables in the test template. The templated tests are executed on one or more data objects in operation 1010. In some examples, operation 1010 further includes dynamically refreshing the metadata during the execution. Decision operation 1012 determines whether the set of templated data tests 140 is complete. If not, flowchart 1000 returns to operation 1008. Otherwise, the results are reported in operation 1014.

Figure 10B:
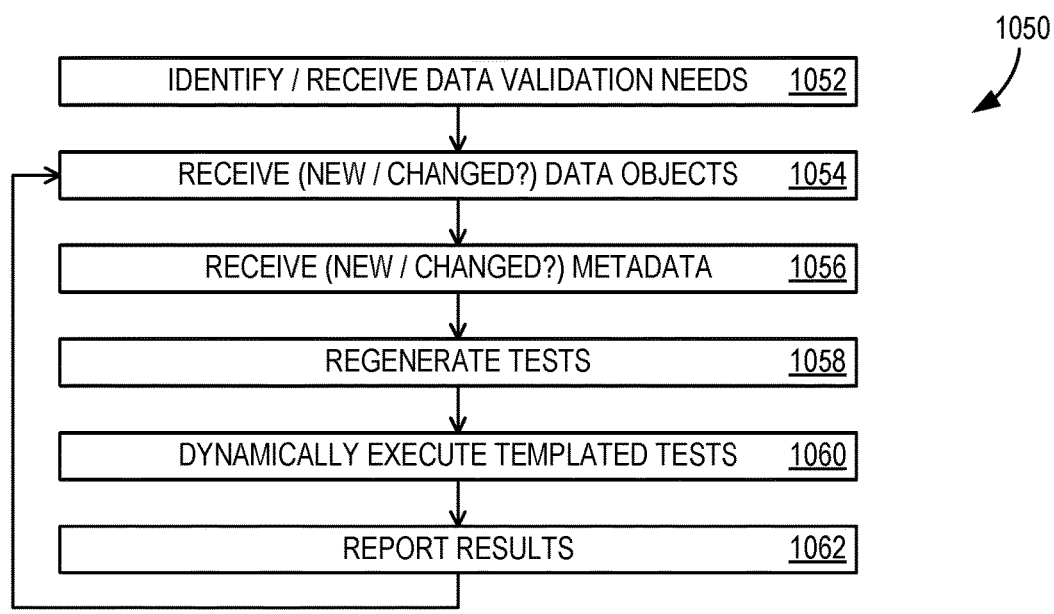

FIG. 10B illustrates a flowchart 1050 of exemplary operations associated with arrangement 100. In some examples, at least a portion of flowchart 1050 may be performed using one or more computing devices 1300 of FIG. 13. In some examples, flowchart 1050 is performed in scenarios of ongoing data monitoring, such as when data objects are updated, changed, or grow in number. Validation needs are identified or received in operation 1052. A set of data objects are received in operation 1054, which may include new data objects or data objects that had been changed (e.g., updated or added to) since the prior round of testing. Metadata is received in operation 1056, which may include metadata that is updated or expanded to reflect new or changed data objects. Templated tests are re-generated in operation 1058, based on the previously configured templates updated data objects, and metadata.

Templated tests are dynamically executed in operation 1060, based on at least the metadata, and results are reported in operation 1062. In some examples, operation 1060 further includes dynamically refreshing the metadata during the execution. Flowchart 1050 then returns to operation 1054 to cycle again, for example on a trigger event or a schedule.

Figure 11:
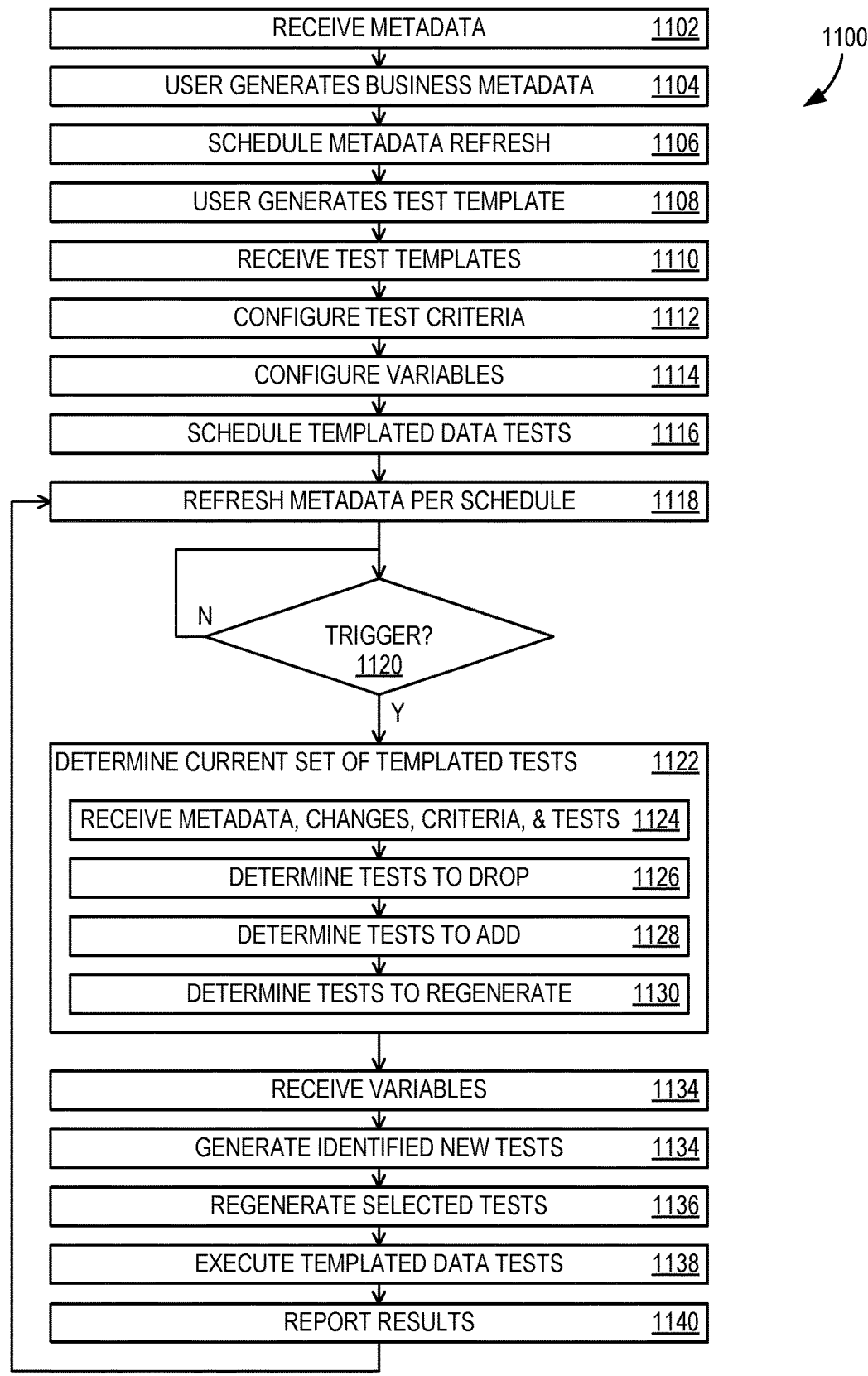
FIG. 11 illustrates another flowchart of exemplary operations associated with FIG. 1.

FIG. 11 illustrates a flowchart 1100 of exemplary operations associated with arrangement 100. In some examples, at least a portion of flowchart 1100 may be performed using one or more computing devices 1300 of FIG. 13. Flowchart 1100 commences with operation 1102, which includes receiving metadata 152 for a plurality of data objects 150. Operation 1104 includes receiving, from user 112, at least a portion of metadata 152 (e.g., business metadata 354). Operation 1106 includes setting schedule 308a for refreshing metadata 152. In some examples, schedule 308a includes a flag to refresh metadata 152 whenever there is a test execution.

Operation 1108 includes generating one or more test templates 110, and operation 1110 includes receiving (by templating data test tool 102) a plurality of test templates 110. Operation 1112 includes configuring test criteria 118 for the plurality of test templates 110, and operation 1114 includes configuring variables 114 for the plurality of test templates 110 to generate an initial set of templated data tests 140. Operation 1116 includes setting schedule 308b for test triggers, wherein a test trigger comprises a timer event based on at least schedule 308b for test triggers. In some examples, schedule 308a for test triggers is independent of schedule 308a for refreshing metadata 152. Operation 1118 includes refreshing metadata 152 (e.g., according to schedule 308a) and determining a change 356 in metadata 152.

Decision operation 1120 detects a test trigger condition (or waits, if one is not detected). Based on at least detecting the test trigger condition, flowchart 1100 proceeds to operation 1122. Operation 1122 includes, based on at least metadata 152 and the plurality of test templates 110, determining a current set of templated data tests 140 (e.g., current set of templated data tests 340 which becomes templated data tests 140 for execution). Operation 1122 is performed by operations 1134-1138.

During the first pass of flowchart 1100 through operation 1122, determining the current set of templated data tests 140 comprises: generating an initial set of templated data tests 140, based on at least variables 114. Operation 1124 includes receiving metadata 152 for the plurality of data objects 150, receiving metadata changes 356, receiving test criteria 118, and receiving the plurality of test templates 110. Determining the set of templated data tests to regenerate comprises, based on at least the refreshing, determining change 356 in metadata 152.

Operation 1126 includes determining at least one templated data test, from a prior set of templated data tests 140, to cease using. Operation 1128 includes determining at least one templated data test to add to the current set of templated data tests 140. Operation 1130 includes determining, within the current set of templated data tests 140, at least one templated data tests to regenerate. Operations 1126-1130 may be performed by determining change 356 in metadata 152 and/or comparing metadata 152 (which includes change 356) with test criteria 118. Operation 1132 includes receiving variables 114 (configured in operation 1114) for the plurality of test templates 110. Operation 1134 includes generating the at least one templated data test to add to the current set of templated data tests 140, and operation 1136 includes regenerating the least one templated data test to regenerate. Operations 1134 and 1136 may use variables 114.

Operation 1138 includes executing templated data tests, within the set of current templated data tests 140, on the plurality of data objects 150. Executing templated data tests 140 comprises receiving the plurality of data objects 150. Some examples include dynamically refreshing metadata 152 for at least one execution of templated data tests 140. Some examples include dynamically refreshing metadata 152 for each execution of templated data tests 140. Test results 160 are reports in operation 1140. Flowchart 1100 returns to operation 1118 for the next scheduled metadata refresh (or decision operation 1120 if the test execution occurs more often).

Figure 12:
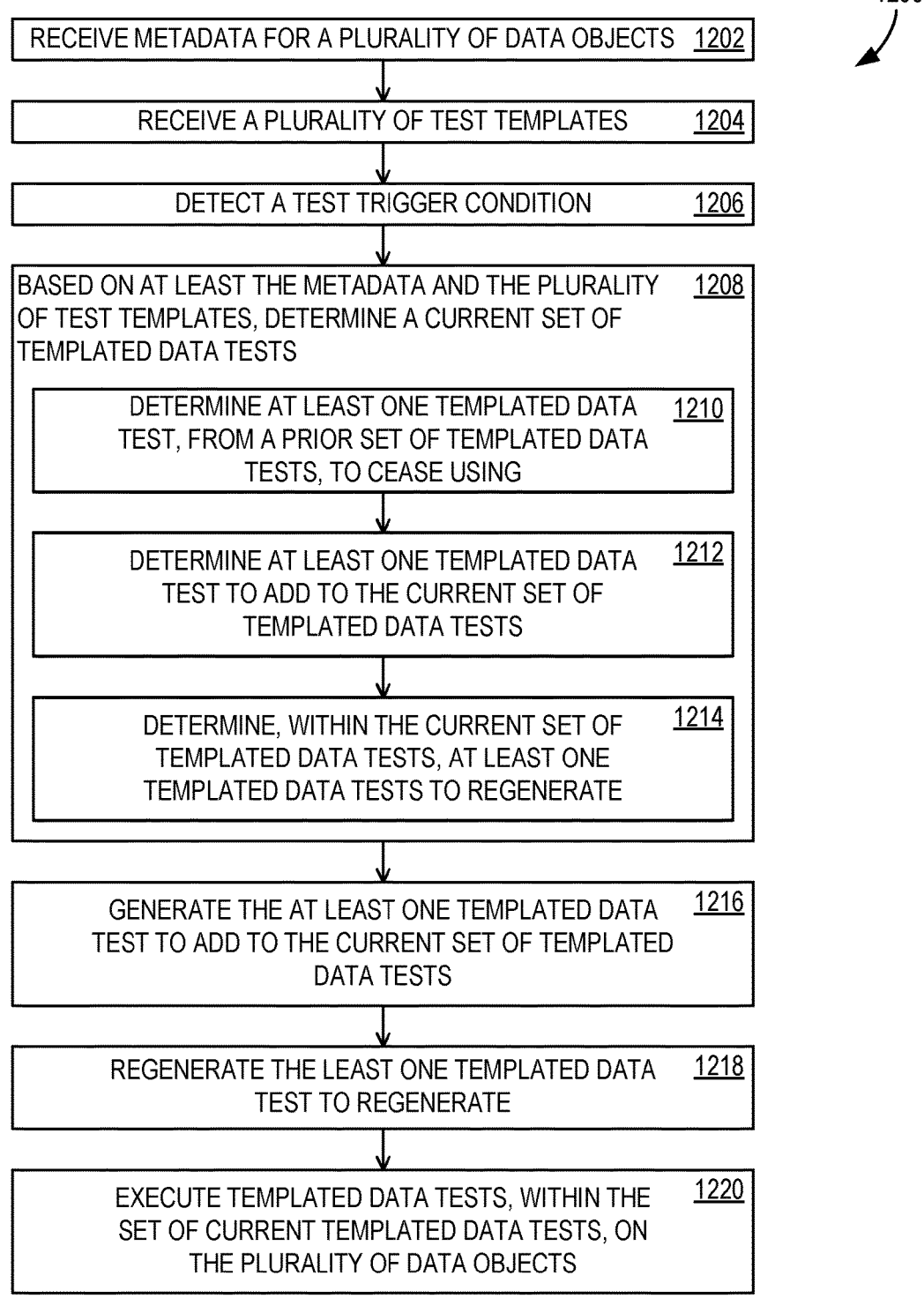
FIG. 12 illustrates another flowchart of exemplary operations associated with FIG. 1.

FIG. 12 illustrates a flowchart 1200 of exemplary operations associated with arrangement 100. In some examples, at least a portion of flowchart 1200 may be performed using one or more computing devices 1300 of FIG. 13. Flowchart 1200 commences with operation 1202, which includes receiving metadata for a plurality of data objects. Operation 1204 includes receiving a plurality of test templates. Operation 1206 detects a test trigger condition. Proceeding to operation 1208 is based on at least detecting a test trigger condition and includes, based on at least the metadata and the plurality of test templates, determining a current set of templated data tests.

Determining the current set of templated data tests is performed using operations 1210-1214. Operation 1210 includes determining at least one templated data test, from a prior set of templated data tests, to cease using. Operation 1212 includes determining at least one templated data test to add to the current set of templated data tests. Operation 1214 includes determining, within the current set of templated data tests, at least one templated data tests to regenerate. Operation 1216 includes generating the at least one templated data test to add to the current set of templated data tests. Operation 1218 includes regenerating the least one templated data test to regenerate. Operation 1220 includes executing templated data tests, within the set of current templated data tests, on the plurality of data objects.

Figure 13:
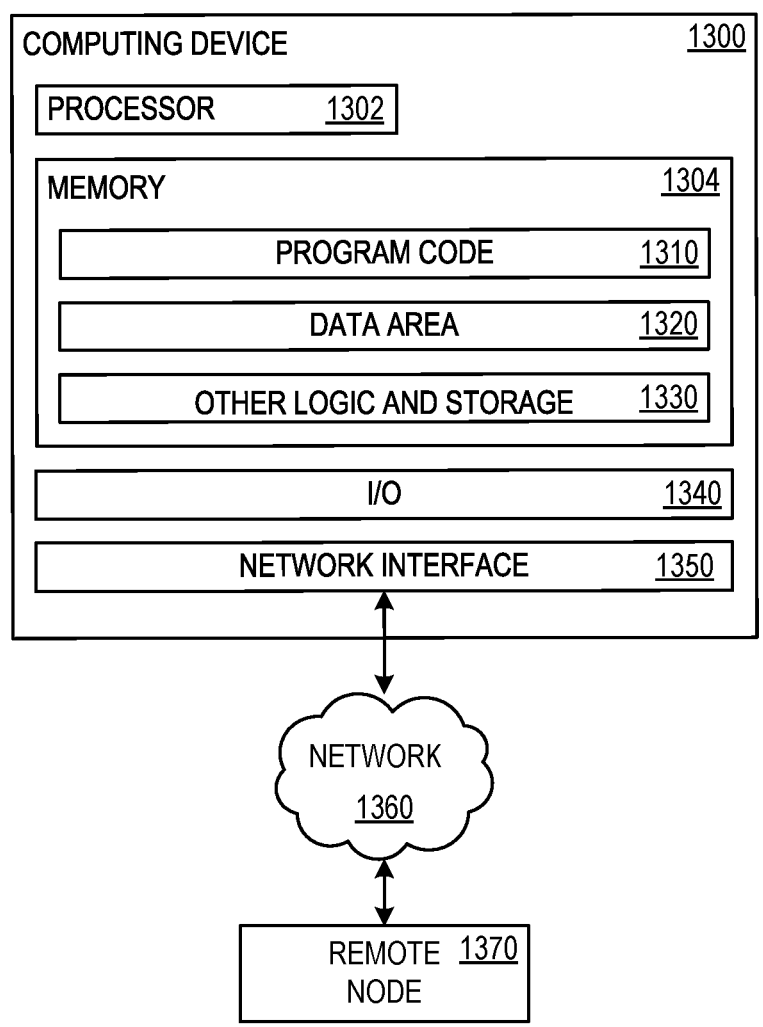
FIG. 13 illustrates a block diagram of a computing device suitable for implementing various aspects of the disclosure.

FIG. 13 illustrates a block diagram of computing device 1300 that may be used as any component described herein that may require computational or storage capacity. Computing device 1300 has at least a processor 1302 and a memory 1304 that holds program code 1310, data area 1320, and other logic and storage 1330. Memory 1304 is any device allowing information, such as computer executable instructions and/or other data, to be stored and retrieved. For example, memory 1304 may include one or more random access memory (RAM) modules, flash memory modules, hard disks, solid-state disks, persistent memory devices, and/or optical disks. Program code 1310 comprises computer executable instructions and computer executable components including any instructions necessary to perform operations described herein. Data area 1320 holds any data necessary to perform operations described herein. Memory 1304 also includes other logic and storage 1330 that performs or facilitates other functions disclosed herein or otherwise required of computing device 1300. An input/output (I/O) component 1340 facilitates receiving input from users and other devices and generating displays for users and outputs for other devices. A network interface 1350 permits communication over a network 1360 with a remote node 1370, which may represent another implementation of computing device 1300. For example, a remote node 1370 may represent another of the above-noted nodes within arrangement 100.

Additional Examples

An example method of dynamically generating data tests comprises: receiving metadata for a plurality of data objects; receiving a plurality of test templates; and based on at least detecting a test trigger condition: based on at least the metadata and the plurality of test templates, determining a current set of templated data tests, wherein determining the current set of templated data tests comprises: determining at least one templated data test, from a prior set of templated data tests, to cease using; determining at least one templated data test to add to the current set of templated data tests; and determining, within the current set of templated data tests, at least one templated data tests to regenerate; generating the at least one templated data test to add to the current set of templated data tests; regenerating the least one templated data test to regenerate; and executing templated data tests, within the set of current templated data tests, on the plurality of data objects.

An example system for dynamically generating data tests comprises: a processor; and a computer-readable medium storing instructions that are operative upon execution by the processor to: receive metadata for a plurality of data objects; receive a plurality of test templates; and based on at least detecting a test trigger condition: based on at least the metadata and the plurality of test templates, determine a current set of templated data tests, wherein determining the current set of templated data tests comprises: determining at least one templated data test, from a prior set of templated data tests, to cease using; determining at least one templated data test to add to the current set of templated data tests; and determining, within the current set of templated data tests, at least one templated data tests to regenerate; generate the at least one templated data test to add to the current set of templated data tests; regenerate the least one templated data test to regenerate; and execute templated data tests, within the set of current templated data tests, on the plurality of data objects.

One or more examples computer storage devices has computer-executable instructions stored thereon, which, upon execution by a computer, cause the computer to perform operations comprising: receiving metadata for a plurality of data objects; receiving a plurality of test templates; and based on at least detecting a test trigger condition: based on at least the metadata and the plurality of test templates, determining a current set of templated data tests, wherein determining the current set of templated data tests comprises: determining at least one templated data test, from a prior set of templated data tests, to cease using; determining at least one templated data test to add to the current set of templated data tests; and determining, within the current set of templated data tests, at least one templated data tests to regenerate; generating the at least one templated data test to add to the current set of templated data tests; regenerating the least one templated data test to regenerate; and executing templated data tests, within the set of current templated data tests, on the plurality of data objects.

An example apparatus for dynamically generating data tests apparatus comprises: a test generation component that generates a plurality of templated data tests for a plurality of data objects, the templated data tests based on at least: metadata for the plurality of data objects, a plurality of test templates, test criteria, and configured variables, and wherein the test generation component further identifies changes in the metadata for the plurality of data objects and based at least on the changes to the metadata for the plurality of data objects: removes at least one templated data test from the plurality of templated data tests, adds at least one templated data test to the plurality of templated data tests, and regenerates at least one templated data test in the plurality of templated data tests; and a test execution component that executes the plurality of templated data tests on a schedule against the plurality of data objects.

Alternatively, or in addition to the other examples described herein, examples include any combination of the following:
  configuring variables for the plurality of test templates;
  generating an initial set of templated data tests based on at least the variables;
  configuring test criteria for the plurality of test templates;
  determining the current set of templated data tests comprises comparing the metadata with the test criteria;
  refreshing the metadata;
  determining the set of templated data tests to regenerate comprises, based on at least the refreshing, determining a change in the metadata;
  receiving, from a user, at least a portion of the metadata;
  setting a schedule for refreshing the metadata;
  setting a schedule for test triggers;
  a test trigger comprises a timer event based on at least the schedule for test triggers;
  dynamically refreshing the metadata for at least one execution of the templated data tests;
  dynamically refreshing the metadata for each execution of the templated data tests;
  executing the templated data tests at least two times between refreshing the metadata;
  the schedule for test triggers is independent of the schedule for refreshing the metadata;
  executing templated data tests comprises receiving the plurality of data objects;
  the metadata comprises business metadata and technical metadata; and
  at least a portion of the business metadata is generated by the user.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of dynamically generating data tests, the method comprising:
    selecting a source of data objects to test, the source of data objects having a plurality of data objects;
    separately from selecting the source of data objects to test, selecting a source of metadata;
    receiving metadata for the plurality of data objects from the selected source of metadata;
    receiving a plurality of test templates; and
    based on at least detecting a test trigger condition:
        based on at least the metadata and the plurality of test templates, determining a current set of templated data tests, wherein determining the current set of templated data tests comprises:
            determining at least one templated data test, from a prior set of templated data tests, to cease using;
            determining at least one templated data test to add to the current set of templated data tests; and
            determining, within the current set of templated data tests, at least one templated data tests to regenerate;
        generating the at least one templated data test to add to the current set of templated data tests;
        regenerating the least one templated data test to regenerate, wherein regenerating the least one templated data test comprises substituting a metadata element into the least one templated data test; and
        executing templated data tests, within the set of current templated data tests, on the plurality of data objects.

2. The method of claim 1, further comprising:
    configuring variables for the plurality of test templates; and
    generating an initial set of templated data tests based on at least the variables.

3. The method of claim 1, further comprising:
    configuring test criteria for the plurality of test templates, wherein determining the current set of templated data tests comprises comparing the metadata with the test criteria.

4. The method of claim 1, further comprising:
    refreshing the metadata, wherein determining the set of templated data tests to regenerate comprises, based on at least the refreshing, determining a change in the metadata.

5. The method of claim 1, wherein the source of data objects comprises cloud storage, and wherein the method further comprises:
    migrating the data objects from a legacy data warehouse to the cloud storage; and
    based on at least executing the templated data tests, determining a completeness of the migration.

6. The method of claim 1, further comprising:
    setting a schedule for refreshing the metadata; and
    setting a schedule for test triggers, wherein the test trigger comprises a timer event based on at least the schedule for test triggers.

7. The method of claim 1, further comprising:
    dynamically refreshing the metadata based on at least having performed execution of the templated data tests.

8. A system for dynamically generating data tests, the system comprising:
    a processor; and
    a computer-readable medium storing instructions that are operative upon execution by the processor to:
        select a source of data objects to test, the source of data objects having a plurality of data objects;
        separately from selecting the source of data objects to test, select a source of metadata;
        receive metadata for the plurality of data objects from the selected source of metadata;
        receive a plurality of test templates; and
        based on at least detecting a test trigger condition:
            based on at least the metadata and the plurality of test templates, determine a current set of templated data tests, wherein determining the current set of templated data tests comprises:
                determining at least one templated data test, from a prior set of templated data tests, to cease using;
                determining at least one templated data test to add to the current set of templated data tests; and
                determining, within the current set of templated data tests, at least one templated data tests to regenerate;
            generate the at least one templated data test to add to the current set of templated data tests;
            regenerate the least one templated data test to regenerate, wherein regenerating the least one templated data test comprises substituting a metadata element into the least one templated data test; and
            execute templated data tests, within the set of current templated data tests, on the plurality of data objects.

9. The system of claim 8, wherein the instructions are further operative to:
    configure variables for the plurality of test templates; and
    generate an initial set of templated data tests based on at least the variables.

10. The system of claim 8, wherein the instructions are further operative to:
    configure test criteria for the plurality of test templates; and
    compare the metadata with the test criteria, wherein determining the current set of templated data tests comprises comparing the metadata with the test criteria.

11. The system of claim 8, wherein the instructions are further operative to:
    refresh the metadata; and
    determine a change in the metadata, wherein determining the set of templated data tests to regenerate comprises, based on at least the refreshing, determining a change in the metadata.

12. The system of claim 8, wherein the source of data objects comprises cloud storage, and wherein the instructions are further operative to:

based on at least executing the templated data tests, determine a completeness of a migration of the data objects from a legacy data warehouse to the cloud storage.

13. The system of claim 8, wherein the instructions are further operative to:
set a schedule for refreshing the metadata; and
set a schedule for test triggers, wherein a test trigger comprises a timer event based on at least the schedule for test triggers.

14. The system of claim 8, wherein the instructions are further operative to:
dynamically refresh the metadata based on at least having performed execution of the templated data tests.

15. One or more non-transitory computer storage devices having computer-executable instructions stored thereon, which, upon execution by a computer, cause the computer to perform operations comprising:
selecting a source of data objects to test, the source of data objects having a plurality of data objects;
separately from selecting the source of data objects to test, selecting a source of metadata;
receiving metadata for the plurality of data objects from the selected source of metadata;
receiving a plurality of test templates; and
based on at least detecting a test trigger condition:
based on at least the metadata and the plurality of test templates, determining a current set of templated data tests, wherein determining the current set of templated data tests comprises:
determining at least one templated data test, from a prior set of templated data tests, to cease using;
determining at least one templated data test to add to the current set of templated data tests; and
determining, within the current set of templated data tests, at least one templated data tests to regenerate;
generating the at least one templated data test to add to the current set of templated data tests;
regenerating the least one templated data test to regenerate, wherein regenerating the least one templated data test comprises substituting a metadata element into the least one templated data test; and
executing templated data tests, within the set of current templated data tests, on the plurality of data objects.

16. The one or more computer storage devices of claim 15, wherein the operations further comprise:
configuring variables for the plurality of test templates; and
generating an initial set of templated data tests based on at least the variables.

17. The one or more computer storage devices of claim 15, wherein the operations further comprise:
configuring test criteria for the plurality of test templates, wherein determining the current set of templated data tests comprises comparing the metadata with the test criteria.

18. The one or more computer storage devices of claim 15, wherein the operations further comprise:
refreshing the metadata, wherein determining the set of templated data tests to regenerate comprises, based on at least the refreshing, determining a change in the metadata.

19. The one or more computer storage devices of claim 15, wherein the source of data objects comprises cloud storage, and wherein the operations further comprise:
based on at least executing the templated data tests, determining a completeness of a migration of the data objects from a legacy data warehouse to the cloud storage.

20. The one or more computer storage devices of claim 15, wherein the operations further comprise:
setting a schedule for refreshing the metadata; and
setting a schedule for test triggers, wherein the test trigger comprises a timer event based on at least the schedule for test triggers.

* * * * *